Figure 5:
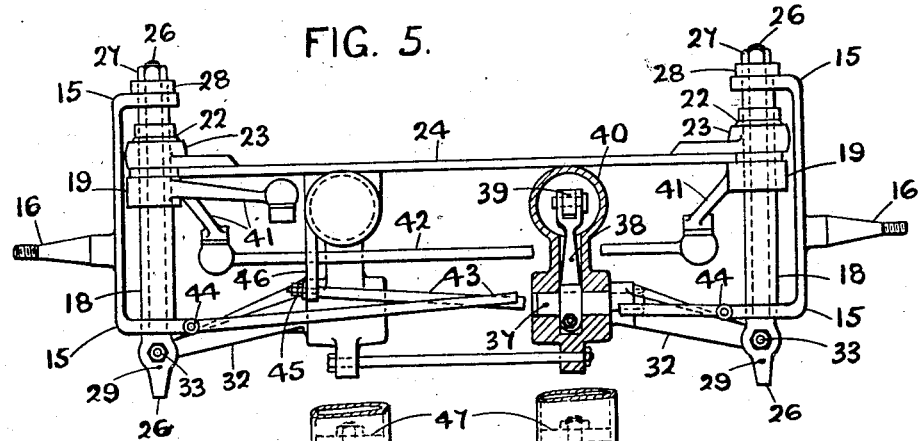

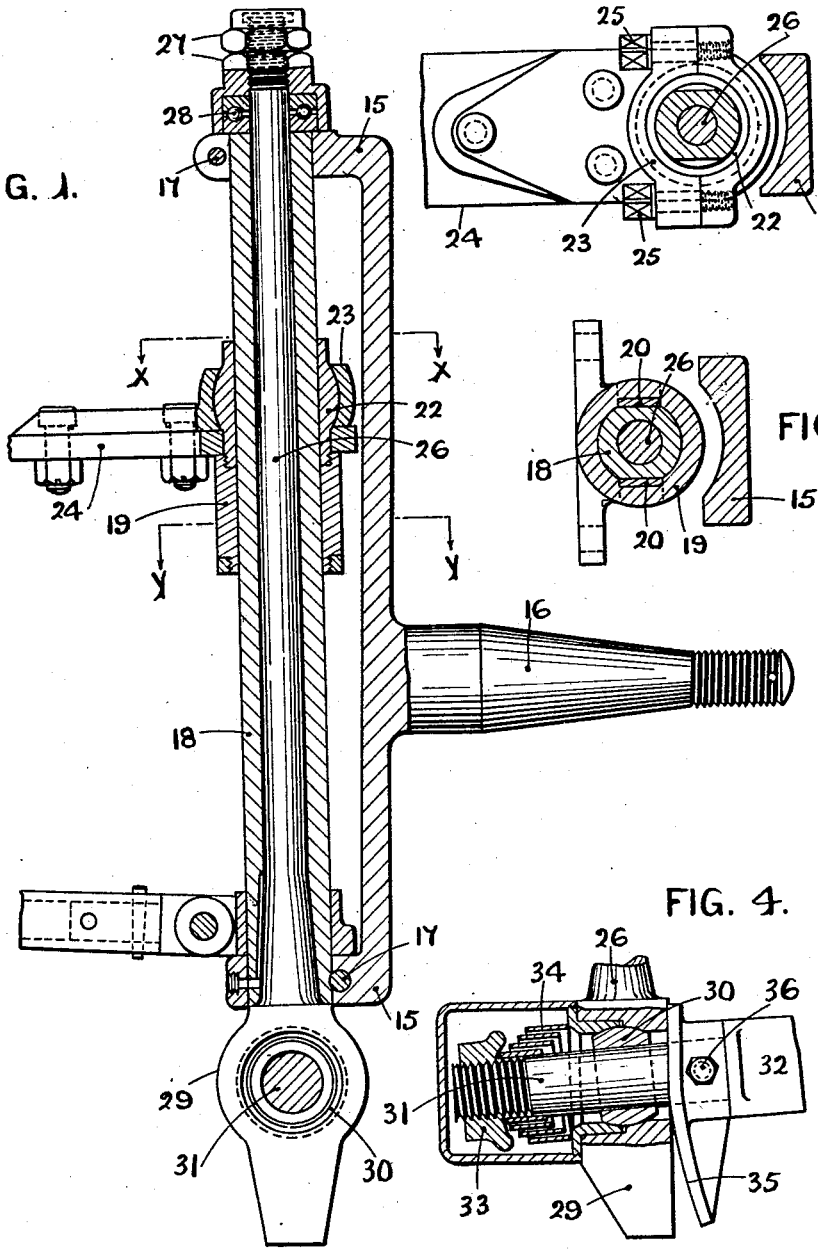

July 21, 1931. D. BROWN 1,815,231
STEERING GEAR FOR MOTOR ROAD VEHICLES AND THE LIKE
Filed Aug. 24, 1929 2 Sheets-Sheet 2

Donald Brown
INVENTOR
BY Toulmin & Toulmin
ATTORNEYS.

Patented July 21, 1931

1,815,231

UNITED STATES PATENT OFFICE

DONALD BROWN, OF HEATON, NEWCASTLE-UPON-TYNE, ENGLAND

STEERING GEAR FOR MOTOR ROAD VEHICLES AND THE LIKE

Application filed August 24, 1929, Serial No. 388,103, and in Great Britain August 31, 1928.

This invention relates to steering gear for motor road vehicles and the like, and is applicable to either heavy or light vehicles wherein the chassis load is transmitted to the front road wheels through spring suspensions co-acting with king pins to which the stub axles of the said wheels are rigidly connected. The object of the present invention is to provide an improved construction.

In steering gear in accordance with this invention, the king pins to which the stub axles of the road wheels are rigidly attached, are mounted in the bosses of the steering arms so as to be free to rise and fall but not to revolve therein. Vertical movement of the bosses of the steering arms is prevented by guides attached to the chassis frame which permit said bosses and hence the king pins to oscillate to a limited extent, the transverse and longitudinal oscillations of said pins being preferably restrained by transverse members and by suspension arms respectively which are connected to the lower ends of the king pins and anchored on the chassis frame. The steering arm bosses and the steering rods, the steering shaft and the steering wheel are thus part of the sprung portion of the vehicle and are not subject to the undamped vibrations of the road wheels.

The accompanying drawings illustrate steering gear in accordance with my invention. In the drawings, Figure 1 is a sectional elevation of a stub axle and king pin; Figure 2 is a plan section on the line X—X therein; Figure 3 is a plan section on the line Y—Y therein; Figure 4 is a sectional elevation at right angles to Fig. 1 of the lower portion thereof; and Figures 5, 6 and 7 are a front elevation, plan and side elevation respectively of the front portion of a vehicle chassis fitted with my improved steering gear.

Referring first to Figs. 1 to 4, in the construction therein illustrated, the jaw 15 of the stub axle 16 is rigidly attached by clamping bolts 17 to the top and bottom of an elongated hollow king pin 18 which passes through the boss 19 of the steering arm which is coupled to the king pin 18, as shown in Fig. 3, by keys 20 so that, while the pin 18 is free to rise and fall in the boss 19, it is prevented from rotating therein. The boss 19 is provided with a spherical extension 22 mounted in a bearing 23 carried by a cross member 24 attached to the chassis frame, said bearing 23 acting as a guide for the boss 19 and preventing vertical movement thereof while permitting a limited oscillation in a lateral direction to allow of the slight movements of the pins due to their connection to the radius rods hereinafter referred to. Preferably, the bearing 23 is made in halves, as shown in Fig. 2, secured by bolts 25. Within the hollow king pin 18 is mounted a vertical shaft 26 suspended at its upper end by nuts 27 and a ball thrust bearing 28 which rests on the upper jaw 15 of the stub axle and carries its appropriate portion of the load of the vehicle.

The shaft 26 is free within the king pin, and at its lower end it is provided with a boss 29 whereby it is attached to the spring suspension of the vehicle, the boss 29 being fitted with a ball 30 (Fig. 4) through which passes the reduced end 31 of a suspension arm 32 connected to the spring suspension of the vehicle. The reduced end 31 is fitted with a nut 33, and a spring 34 is interposed between said nut and the face of the boss 29. The end 31 is also fitted with a shoe 35 which is fixed on said end by a stud 36. The spring 34 causes the shoe to bear on the opposite face of the boss 29 to that against which the spring 34 bears, and the shoe 35 is curved to a radius from the axis of the shaft 37 (Figs. 5–7) about which the suspension arm 32 rocks so that the radial movements of said arm as the king pin 18 rises and falls do not affect the direct contact of the shoe 35 with the boss 29, and true vertical movement is obtained in all positions.

Figure 6:
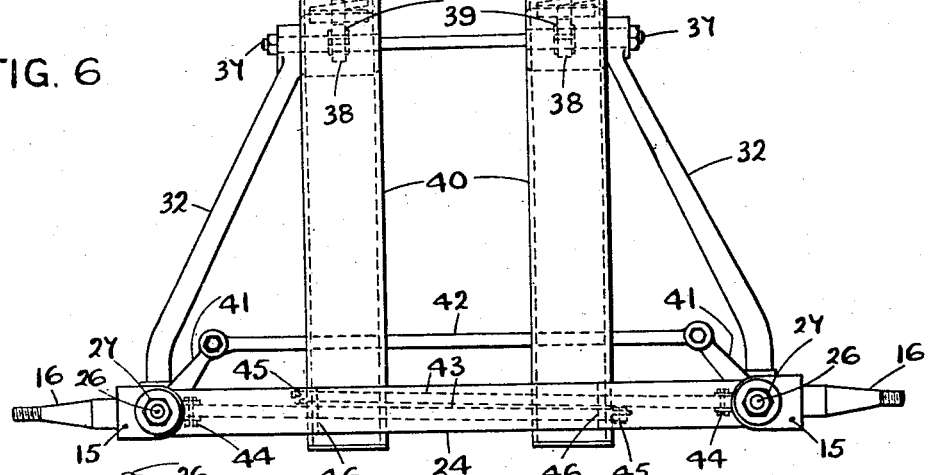
Figure 7:
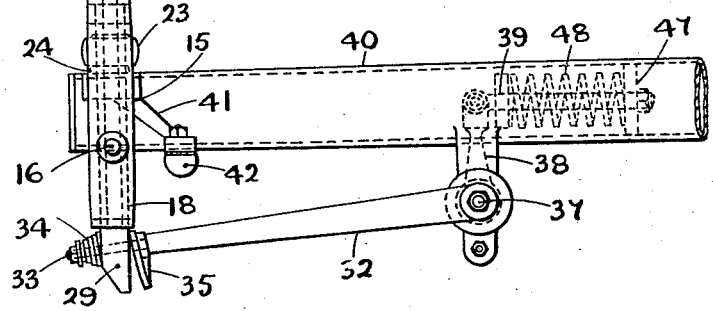

Figs. 5, 6 and 7 illustrate, by way of example, the application of steering gear in accordance with this invention to a spring suspension of the kind wherein the radial movements of the suspension arms 32 about the shafts 37 whereon they are fixed are transferred by arms 38 also fixed on said shafts to rods 39 attached to heads 47 coacting with spiral springs 48 or other resilient devices housed within the tubular frame members 40 of the vehicle chassis, it being understood that my improved steering gear is equally applicable to other suitable types of suspension. In Figs. 5, 6 and 7, 41 are the steering arms attached to the bosses 19 and coupled together by a link 42 as usual, said steering arm being operated by the usual steering arm mechanism controlled by the steering wheel of the vehicle.

The chassis members 40 and the cross member 24 are suspended from the shafts 26, and the load is transferred thereby through the nuts 27 and thrust bearings 28 to the king pins 18 and so to the jaws 15 of the stub axles 16, and it will be seen that the rise and fall of the stub axles are transmitted to the king pins and through the vertical suspension shafts 26 therein to the suspension arms 32 to the spring suspension of the vehicle and thus absorbed, and, as the king pins 18, shafts 26 are free to rise and fall within the steering bosses 19, the steering arms 41 are not affected thereby, and the vertical motions of the road wheels are not transmitted to the steering gear which is supported by the chassis frame member 24 and hence is part of the sprung portion of the vehicle.

To absorb lateral strains and maintain the proper position of the front road wheels, a pair of transversely disposed radius rods 43 are provided, one end of each rod being pivotally attached at 44 to the lower part of the king pin 18 and the other end of said rod being pivotally attached at 45 to a bracket 46 depending from the frame member 40 at the opposite side of the chassis, the rods 43 crossing in front of the vehicle.

It will be obvious that the suspension shafts 26 may be dispensed with, and the suspension arms 32 directly attached to the lower ends of the king pins 18 through spherical bearings or otherwise conveniently.

By this construction, the chassis load is transmitted through the spring suspension and the king pins to the stub axles of the front road wheels, and the steering gear is attached to the chassis frame and hence is a part of the sprung portion of the vehicle and is unaffected by the rise and fall of the road wheels due to irregularities of the road surface or to obstructions thereon. In this way, the usual constant vibration imparted to the steering wheel by the road wheels during running is entirely or very largely eliminated, the effect of my improved arrangement being that on the rise and fall of either road wheel, the centres of the steering arms are not relatively varied hence no "steering snatch" or wheel wobble occurs such as happens in steering gear of the type hitherto customary.

What I claim and desire to secure by Letters Patent is:—

1. Steering gear for the front road wheels of motor road vehicles and the like comprising king pins, rigid connections between said king pins and the stub axles of said front road wheels, spring suspensions co-acting with said king pins to absorb the up-and-down movements of said road wheels, a boss on each of said king pins, a steering arm connected to said boss, and a connection between said boss and said king pin which allows vertical movement of said pin in said boss but prevents relative rotation therebetween.

2. Steering gear for the front road wheels of motor road vehicles and the like comprising king pins, rigid connections between said king pins and the stub axles of said front road wheels, spring suspensions co-acting with said king pins to absorb the up-and-down movements of said road wheels, a boss on each of said king pins, a steering arm connected to said boss, and a connection between said boss and said king pin which allows vertical movement of said pin in said boss but prevents relative rotation therebetween, and a guide attached to the frame of the vehicle which prevents vertical movement of said boss but allows lateral oscillation of said boss and king pin.

3. Steering gear for the front road wheels of motor road vehicles and the like comprising king pins, rigid connections between said king pins and the stub axles of said front road wheels, spring suspensions coacting with said king pins to absorb the up-and-down movements of said road wheels, a boss on each of said king pins, a steering arm connected to said boss, and a connection between said boss and said king pin which allows vertical movement of said pin in said boss but prevents relative rotation therebetween, a spherical extension on said boss, and a bearing therefor carried by the frame of the vehicle, said bearing forming a guide which prevents vertical movement of said boss but allows lateral oscillation of said boss and king pin.

4. Steering gear for the front road wheels of motor road vehicles and the like comprising king pins, rigid connections between said king pins and the stub axles of said front road wheels, spring suspensions co-acting with said king pins to absorb the up-and-down movements of said road wheels, a boss on each of said king pins, a steering arm connected to said boss, and a connection between said boss and said king pin which allows vertical movement of said pin in said boss but prevents relative rotation therebetween, a spherical extension on said boss, and a bearing therefor carried by the frame of the vehicle, said bearing forming a guide which prevents vertical movement of said boss but allows lateral oscillation of said boss and king pin, and means for restraining the transverse and longitudinal oscillations of said boss and king pin comprising a transverse member and a longitudinally disposed suspension arm connected to the lower end of said king pin and anchored on the vehicle frame.

In testimony whereof, I affix my signature.

DONALD BROWN.